UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

PROCESS OF EFFECTING CHEMICAL REDUCTIONS AND PRODUCING METALS AND ALLOYS.

No. 858,329.     Specification of Letters Patent.     Patented June 25, 1907.

Application filed April 12, 1907. Serial No. 367,723.

*To all whom it may concern:*

Be it known that I, FREDERICK M. BECKET, a subject of the King of Great Britain, residing at Niagara Falls, in the county of Niagara and State of New York, have invented certain new and useful Improvements in Processes of Effecting Chemical Reductions and Producing Metals or Alloys, of which the following is a specification.

This process is especially designed for the reduction of metallic oxids, such as those of vanadium, molybdenum, titanium and tungsten.

The process involves reduction in two stages, in the first of which partial reduction, specifically from a higher to a lower state of oxidation, is effected by a non-metallic reagent, such as carbon, hydrogen, carbon monoxid or a hydrocarbon; and further reduction, specifically to a metal, by silicon carbid.

For the purpose of illustration, the production of ferro-vanadium will be described. An oxid ore of vanadium or an ore which has been treated to convert the vanadium to the oxidized state, or a concentrate from such ores, intimately mixed with carbon in amount sufficient to effect reduction of vanadic oxid to vanadous oxid and of any ferric oxid that may be present to ferrous oxid, is heated in a combustion or electric furnace to the moderate temperature required for the partial reduction of these oxids.

An example of the reducing action of carbon on vanadic oxid may be expressed by the reaction:

$$V_2O_5 + 2C = V_2O_3 + 2CO.$$

The material containing the partially reduced vanadium oxid is then mixed with silicon carbid and smelted, preferably in an electric furnace, at the temperature necessary to effect complete reduction of the oxid to vanadium. The percentage of iron in the alloy is controlled by the percentage of iron oxid in the vanadium ore or concentrate used, or by the addition of iron. The final reduction is represented by the equation:

$$V_2O_3 + SiC = V_2 + SiO_2 + CO.$$

Gaseous reducing agents may be efficiently employed in the first stage of the process, the reduction from a higher to a lower state of oxidation, producer-gas and water-gas being particularly advantageous for the purpose.

By this process, partial reduction of metallic oxids is effected by means of relatively inexpensive non-metallic reducing agents and the final or complete reduction is effected by a relatively small amount of silicon carbid.

I claim:

1. The process of effecting chemical reductions, which consists in effecting partial reduction by a non-metallic reagent and further reduction by silicon carbid.

2. The process of reducing oxids, which consists in effecting partial reduction by a relatively-oxidizable nonmetal and further reduction by silicon carbid.

3. The process of reducing oxids, which consists in effecting partial reduction by carbon and further reduction by silicon carbid.

4. The process of reducing vanadic oxid, which consists in effecting reduction to vanadous oxid by a non-metallic reagent and reduction to vanadium by silicon carbid.

5. The process of reducing vanadic oxid, which consists in effecting reduction to vanadous oxid by carbon and reduction to vanadium by silicon carbid.

6. The process of reducing refractory metallic oxids, which consists in effecting partial reduction by electrically smelting a mixture of the oxid and carbon, and effecting complete reduction of the product by silicon carbid.

7. The process of reducing refractory metallic oxids, which consists in effecting partial reduction by electrically smelting a mixture of the oxid and carbon, and effecting complete reduction of the product by silicon carbid and electrically-supplied heat.

8. The process of effecting chemical reductions, which consists in effecting partial reduction by a non-metallic reagent and further reduction by silicon carbid, and electrically supplying heat for both reductions.

In testimony whereof, I affix my signature in presence of two witnesses.

FREDERICK M. BECKET.

Witnesses:
   P. A. MOSHER,
   J. N. DEINHARDT.